United States Patent [19]

Yan et al.

[11] Patent Number: 4,458,033

[45] Date of Patent: Jul. 3, 1984

[54] REGENERATION OF CATIONIC RESIN IN NONAQUEOUS MEDIA

[75] Inventors: Tsoung-Yuan Yan, Philadelphia, Pa.; Paul Shu, Princeton Junction, N.J.

[73] Assignee: Mobil Oil Corporation, New York, N.Y.

[21] Appl. No.: 488,506

[22] Filed: Apr. 25, 1983

[51] Int. Cl.³ .............................................. B01J 49/00
[52] U.S. Cl. ...................................... 521/26; 210/683
[58] Field of Search .......................... 521/26; 210/683

[56] References Cited

U.S. PATENT DOCUMENTS

| | | | |
|---|---|---|---|
| 2,388,224 | 10/1945 | Behrman | 54/26 |
| 2,689,229 | 9/1954 | Kimberlin, Jr. et al. | 521/26 |
| 3,019,182 | 1/1962 | Chonmugon | 521/26 |
| 3,313,726 | 4/1967 | Campbell et al. | 521/26 |
| 4,370,239 | 1/1983 | Jensen | 210/623 |

*Primary Examiner*—Joseph L. Schofer
*Assistant Examiner*—Peter F. Kulkosky
*Attorney, Agent, or Firm*—Alexander J. McKillop; Michael G. Gilman; Laurence P. Hobbes

[57] ABSTRACT

A process for the direct regeneration of acid resin using a nonaqueous eluant saturated with anhydrous acid.

25 Claims, No Drawings

REGENERATION OF CATIONIC RESIN IN NONAQUEOUS MEDIA

BACKGROUND OF THE INVENTION

1. Field of the Invention

This application is directed to a process for the direct regeneration of acidic resin wherein the regeneration vehicle is saturated with anhydrous acid as the eluant. It is more particularly directed to nonaqueous systems wherein the resin is acidic.

2. Description of Prior Art

Acidic resins have been shown to be effective for removing basic nitrogen compounds from lube oils and jet fuels, thereby improving their quality. It is also known that the thermal and light stabilities of lube oils and distillate fuels can be improved by contacting them with acidic (cationic) resins. The exact mechanism for such improvement is not completely known, but it is speculated that it is due to the removal of polar compounds, particularly basic polar compounds from the base oil.

Nitrogen compounds are poisonous to catalysts used for catalytic cracking and hydrocracking. In addition, they produce $NO_x$ emission when the fuel is burned. In nitrogen removal by such processes, cationic exchange resins can be used advantageously owing to their high treating capacity. In order to make the process viable, the spent resin has to be regenerated economically. However, current techniques for resin regeneration utilize aqueous solutions and the attendant problems resulting from the need to switch between aqueous and organic cycles make the process cumbersome and expensive.

Conventionally, acidic aqueous solutions are used in the regeneration of acid resins. The product can be contaminated by water unless the costly step of solvent flushing of the regenerated resin is used before using the resin for a second cycle. In this type of flushing substantially more waste stream is generated. In addition, the aqueous solution is corrosive, which destroys equipment and leads to product contamination by metallic ions such as Fe, Ni, Mo, etc. However, it has now been found that spent acid resin can be regenerated in nonaqueous media avoiding much of the above-described problem areas.

SUMMARY OF THE INVENTION

The process in accordance with the invention may be generally described as follows:

1. Lube oil or distillate fuel, etc. (particularly kerosene or jet fuel) is percolated over, for example, an ion exchange resin in acid form. The percolation is continued until the breakthrough of basic nitrogen compounds or the incremental amount of product fails to meet the thermal, light or color stability criteria. The spent resin may then be regenerated as follows:
2. The regeneration solution is prepared by incorporating, in any convenient manner, the desired amount of anhydrous acid into a suitable solvent.
3. The regeneration solution is then passed over the spent resin until the resin is substantially free of contaminants. (This can be done at ambient or elevated temperatures if it is desirable to alter the solubility of the contaminants in the solution.)
4. The resin thus regenerated is thereafter readied for another cycle.
5. The resultant nitrogen or other contaminant-rich stream, is then processed for recovery of valuable by-product chemicals and the clean oil or fuel produced is readied for marketing or other processing. Alternatively, the acid gas may be percolated through the column separately and thereafter solvent used as needed to flush the column.

Any anhydrous acid, organic or non-organic, strong enough to elute poisonous basic nitrogen compounds, can be employed. Other suitable anhydrous acid gases include HBr, $H_2S$, $SO_2$ and $SO_3$. Generally anhydrous acids with pHs less than about 5 may advantageously be used. A preferred acid is anhydrous HCl.

Various aromatics, alcohols and other similar compounds with high solubility for the nitrogen-acid salts, can be employed as solvent for washing the column to remove other acidic or basic poisonous compounds. The boiling range of suitable solvents depends on the procedure for recovering it from the eluate for recycle. If distillation technique is chosen, a low boiling solvent is preferred to facilitate the separation; on the other hand, if extraction (e.g., water) is employed, its solubility in the solvent and vapor pressure should be low to minimize the solvent loss. Many diverse organic solvents such as $CH_2Cl_2$ (methylene chloride), THF (tetrahydrofuran), ethylene glycols, high C-number alcohols, and ethers can be employed to further add to process flexibility.

The active group of the strong acid resin is generally, sulfonic acid. For the weak acid resins the active groups generally are carboxylic acid and phosphoric acid. The acid strength of the preferred resin depends on the nature of the nitrogen compounds or other poisons. In order to be effective for the removal of nitrogen compounds, the acidity of the resin should be strong. However, for efficient elution, the acidity of the resin should be weak. As a result, the acidity of the resin should be strong enough for nitrogen compounds but weak enough for efficient elution. For weak basic nitrogen compounds, strong acidic resin is required to assure effective removal. On the other hand, for strong basic nitrogen compounds, weak acid resin can be used to obtain effective removal.

The resins should be swelled either in the non-aqueous feed stock and solvent or, else be macroreticular to provide diffusion channels and contacting surface areas. The typical matrix of the resins are comprised of co-polymers of phenolic and acrylic styrene and divinylbenzene. Commercial strong acid resins include: Amberlyst 15, Amberlyst XN1010, Amberlyst 1011, Amberlite IR-120, Amberlite 200, Dowex MPC-1, Dowex 50, Dowex MSC-1, Imac C-12, Imac C-116P, Doulite C-3. The weak acid resins include Amberlite IRC-50, Amberlite IRC-84. Doulite ES-63, Doulite Es-80, Ionac C-270, Dowex COR-2, etc.

DESCRIPTION OF SPECIFIC EMBODIMENTS

Example 1

A commercial acid cationic exchange resin, Amberlyst 15 (a sulfonated styrene-divinylbenzene in acid form) was used in this example. Pyridine in xylene was used as a model system to simulate nitrogen compounds (pyridine) in lube oils and distillates (xylene). A solution containing 10,000 ppm (0.124 meq/ml) of pyridine was pumped upwards through a column packed with 2 to 5 gm. of resin. Fractions of effluent were collected to test its pyridine concentration by titrating against 0.1N HCl. Pyridine breakthrough was detected when its concentration in the effluent had increased. When the pyridine concentration increased to the same level as in the feed, the column had reached its exchange capacity.

After the column reached exchange capacity, it was regenerated with the following procedures:

A stream of anhydrous HCl gas was admitted, to regenerate the column in an upflow manner, until fumes of HCl could be detected at the top of the column. In regeneration operation, the hydrochloride salts of the nitrogen compounds formed insoluble salts as evidenced by the cloudiness of the column. Following the HCl treatment, methylene chloride ($CH_2Cl_2$) was pumped through the column to dissolve the HCl salts and to flush excess HCl. The salts can then be recovered from the wash solution in any convenient manner. For example, when solvents of high vapor pressure, such as methylene chloride, are used, the solvent can readily be recovered for recycle by distillation or simple stripping. The HCl nitrogen salts are recovered as the bottom product. The nitrogen compounds can thereafter be recovered from the nitrogen salt by such means as hydrolysis and thermal decomposition.

After stripping the regenerated column with hot air or vacuum, the column was ready for the next loading. After three cycles of regenerations, the resin had an exchange capacity of 1.84 milliequivalent/gram. (See the Table) This was somewhat lower than the fresh loading capacity of 2.7 meq/gm obtained from Example 3. It is believed to be due to some deactivation by moisture or bulky absorbents.

Example 2

The similar procedures for preparation of the resin used herein were as described in Example 1, except that the flushing solvent used was tetrahydrofuran (THF). After the fifth regeneration of this procedure, the resin still had 1.42 meq/gm of exchange capacity. THF was recovered from the wash solution for recycle by distillation. The HCl nitrogen salts were recovered from this distillation as the bottom product. The nitrogen compounds can be recovered as in Example 1. An advantage of using THF is that it can be effectively and readily removed from the column by steam stripping.

Example 3

In this example, anhydrous HCl was introduced into the resin (same as Example 1) as a saturated/super saturated solution in methanol. In order to do this, feed was gradually replaced by methanol for regeneration and returned to loading mode following the flushing sequence shown below, using substantially equivalent aliquots of flushing material.

(1) xylene; (2) $CH_2CL_2$; (3) $CH_3OH$; (4) $HCL/CH_3OH$; (5) $CH_3OH$; (6) $CH_2CL_2$; (7) xylene.

After regeneration in this manner for 3-6 cycles, the resin had an exchange capacity of 1.68-1.76 meq/gm.

TABLE

| Loading Capacity of Amberlyst 15 | | |
|---|---|---|
| EXAMPLE No. | No. of Regenerations | Loading Capacity Meq/gm |
| 1 | 3 | 1.84 |
| 2 | 5 | 1.42 |

TABLE-continued

| Loading Capacity of Amberlyst 15 | | |
|---|---|---|
| EXAMPLE No. | No. of Regenerations | Loading Capacity Meq/gm |
| 3 | 1 | 2.70 |
|   | 3 | 1.68 |
|   | 5 | 1.68 |
|   | 6 | 1.76 |

The regeneration data show that the loading capacity after each regeneration remained substantially constant. The constancy in loading capacity indicates that the regeneration procedure is effective. The data in the Table thus summarizes the loading capacity of the cationic exchange resins in accordance with the invention.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A process for the regeneration of spent ion-exchange resin comprising contacting the spent resin for a time sufficient with a sufficient amount of anhydrous acid gas to effectively remove from said resin substantially all undesired contaminants present therein and thereafter recycling the regenerated resin for reuse.

2. The process of claim 1 wherein the undesired contaminants present in said ion-exchange resin result from prior treatment of a lubricating oil or a normally liquid hydrocarbon fuel.

3. The process of claim 2 wherein the presence of said contaminants results from the prior treatment of a lubricating oil.

4. The process of claim 2 wherein the presence of said contaminants results from the prior treatment of a hydrocarbon fuel selected from distillate fuels such as naphtha, kerosene, jet fuel or distillates.

5. The process of claim 1 wherein the anhydrous acid gas is incorporated into a suitable solvent prior to contacting said spent resin.

6. The process of claim 5 wherein said solvent may be water-soluble or water-insoluble.

7. The process of claim 1 wherein said resin is flushed with a suitable solvent after contact with said anhydrous acid gas.

8. The process of claim 7 wherein said solvent may be water-soluble or water-insoluble.

9. The process of claim 1 wherein the anhydrous acid gas is selected from the group consisting of HCl, HBr, $H_2S$, $SO_2$ and $SO_3$.

10. The process of claim 9 wherein said acid gas is anhydrous HCl.

11. The process of claim 5 wherein said solvent is selected from $CH_2CL_2$, THF, ethylene glycol, suitable ethers and propanol.

12. The process of claim 7 wherein said solvent is selected from $CH_2Cl_2$, THF, ethylene glycol, suitable ethers and propanol.

13. The process of claim 5 wherein said acid gas is anhydrous HCl and said solvent is $CH_2Cl_2$.

14. The process of claim 7 wherein said acid gas is anhydrous HCl and said solvent is $CH_2Cl_2$.

15. The process of claim 11 wherein the spent resin is a cationic resin.

16. The process of claim 12 wherein the spent resin is a cationic resin.

17. The process of claim 13 wherein the spent resin is a cationic resin.

18. The process of claim 14 wherein the spent resin is a cationic resin.

19. The process of claim 15 wherein the resin is an acid form sulfonated styrene-divinylbenzene resin.

20. The process of claim 17 wherein the resin is an acid form sulfonated styrene-divinylbenzene resin.

21. The process of claim 16 wherein the spent resin is an acid form sulfonated styrene-divinylbenzene resin.

22. The process of claim 18 wherein the spent resin is an acid form sulfonated styrene-divinylbenzene resin.

23. The process of claim 1 wherein said regeneration is carried out in non-aqueous media.

24. The process of claim 1 wherein nitrogen salts present in the contaminant-rich stream resulting from removing said undesired contaminants are treated by hydrolysis to produce valuable chemical by-products.

25. The process of claim 1 wherein nitrogen salts present in the contaminant-rich stream resulting from said undesired contaminants are treated by thermal decomposition to produce valuable chemical by-products.

* * * * *